No. 657,984. Patented Sept. 18, 1900.
J. HARRIS.
ELECTRIC MEASURING INSTRUMENT.
(Application filed July 20, 1899.)

(No Model.) 2 Sheets—Sheet 2.

Witnesses
Inventor
Jesse Harris
By his Attorney
W. M. Brown.

UNITED STATES PATENT OFFICE.

JESSE HARRIS, OF LYNN, MASSACHUSETTS.

ELECTRIC MEASURING INSTRUMENT.

SPECIFICATION forming part of Letters Patent No. 657,984, dated September 18, 1900.

Application filed July 20, 1899. Serial No. 724,500. (No model.)

*To all whom it may concern:*

Be it known that I, JESSE HARRIS, a citizen of the United States, residing at Lynn, Massachusetts, have invented certain new and useful Improvements in Electric Measuring Instruments; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide a new and improved electric measuring instrument.

Figure 1:
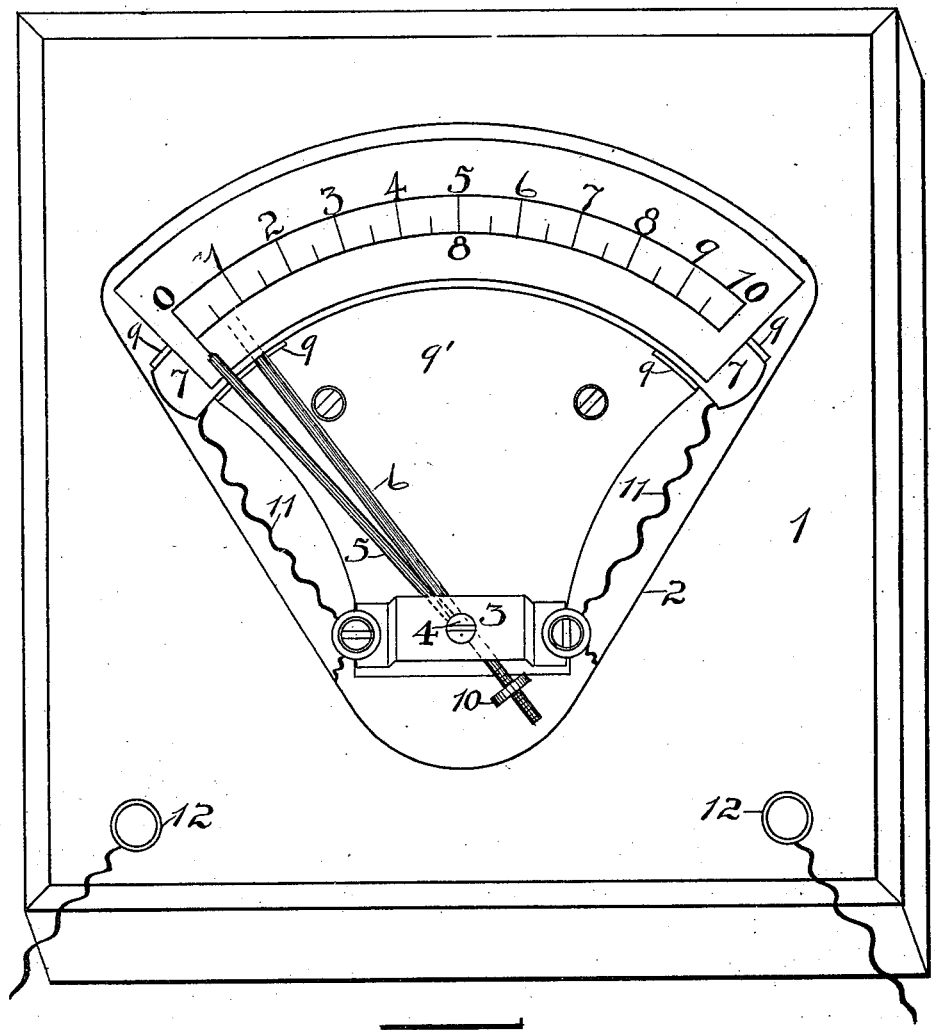
Figure 2:
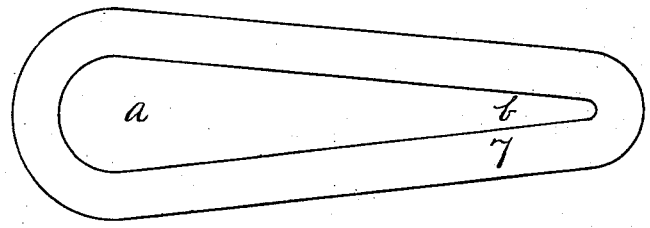
Figure 3:
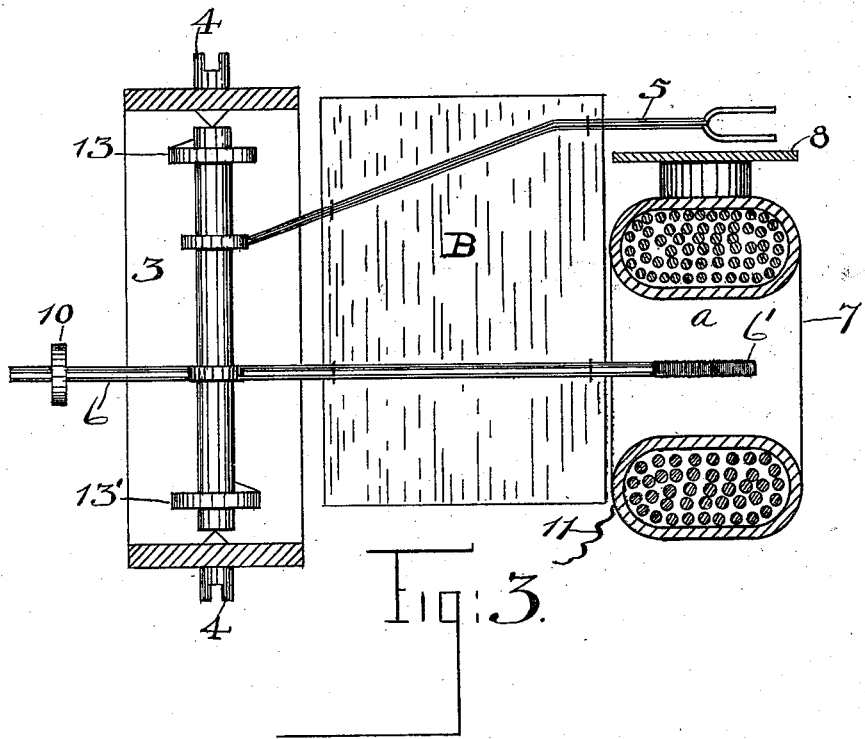

Figure 1 shows a top plan view of my instrument in operative construction; Fig. 2, a side elevation of the field coil or solenoid; and Fig. 3, a side elevation of the moving parts, with the field-coil shown in cross-section and the supporting-frame shown in vertical section.

The numeral 1 shows a wooden block preferably recessed to receive my instrument, 2 showing the recess therein.

My instrument consists mainly of what I denominate an "angular" coil or solenoid 7— *i. e.*, a loop of wire wound and insulated in the usual manner—the loop being so formed that the opening $a$ at one end is greater than the opening $b$ at the opposite end, forming what I denominate an "angular coil" or "angular solenoid," notwithstanding the opening may or may not be actually angular. This coil receives the current to be measured through conductors 11 and 12.

The moving parts consist of the arm 6 and the pointer 5, which are pivotally attached to a frame 3 by means of an adjustable pivot or pivots 4 4, the points of said pivots preferably working in jewels set in the ends of the shaft, to which shaft is attached the coiled springs 13 and 13' or other operative resilient devices, the outer ends of said springs being so attached to the frame 3 that their resilience will exert a certain amount of resistance to the rotation of the shaft. To this shaft is also attached the pointer 5, having its free end bifurcated, preferably, so as to have the two indexes in order that the reading of the scale may be facilitated. To the shaft is also attached a homogeneous arm 6, having a piece or pieces of soft iron 6' attached to its outer extremity and having an adjusting-weight 10 arranged to be moved along the arm as may be desired. Directly under the bifurcated ends of the pointer 5 is secured a graduated scale 8, over which the pointer moves. To the pointer 5 and arm 6 is attached an air-brake B, consisting, preferably, of a non-metallic material and, as shown, a plate of mica. In the recess of the block 1 is a metal base-plate 9', to which is affixed the frame 3, and the coil is affixed there by means of ears or studs 9.

My instrument operates as follows: When the current to be measured passes through the coil 7, the magnetic flux becomes more dense at the narrower end $b$ of the coil, and the homogeneous arm 6 is drawn more and more toward this narrow end as the current increases, and thus swings the pointer 5 with it. As the arm 6 and pointer 5 swing by means of the shaft the rotation of the shaft is opposed by the springs 13 and 13', and when there is no current passing these springs force the pointer 5 back to zero-point. The adjusting-weight 10 acts as a balance, allowing the weight of arm 6 to be centered on the shaft, so as to lessen friction and maintain a balance of the moving parts in all positions, while air-brake B steadies the movements of the pointer, preventing the pointer from oscillating back and forth, as it would do if no means were provided to prevent it.

My instrument, then, may be described as consisting of a coil or conductor traversed by a current to be measured, the coil being a loop or solenoid wider open at one end than the other, as seen at 7, and so arranged and having a movable magnetizable body, as seen at 6 and 6', so arranged as to be within the influence of the said coil and to moved thereby by reason of the magnetic flux becoming more dense at the narrower end $b$ of the coil and having means, preferably springs 13 and 13', by which the pointer 5 is brought to zero when no current flows, and an air-brake, as B, arranged so that as it moves against the atmosphere it steadies the motion of the pointer, the free end of the pointer 5 being bifurcated or having a plurality of ends or sights, so as to assist in reading the graduated scale, the error due to the parallax being thereby corrected. It will be observed that my meter or measuring instrument when so arranged will operate in a variety of positions and is not confined to being placed in any one position, as it will operate when laid upon a table either on its face or its back and when hung on a wall perpendicularly or at any angle therefrom.

Having arranged my meter as seen in Fig. 1, in which form it is an ammeter by reason of having used large wire for the winding of the field 7, it remains to be stated that my meter or measuring instrument may be either a voltmeter or an ammeter by simply using different-sized wire for the winding, as if large wire be used an ammeter will be produced, but if small wire be used, whereby the resistance is raised, then a voltmeter results, and alternating as well as continuous currents may be measured.

Having described my invention, what I claim is—

1. In an electric measuring instrument a coil or solenoid traversed by an electric current to be measured, the coil or solenoid having a tapering opening and a movable homogeneous magnetizable arm or body within said opening, and an indicator; the arm and the indicator being arranged to be moved by the influence of the current and to be operative in any position, and having means for bringing the indicator to zero when no current flows through the coil substantially as described.

2. In an electrical measuring instrument a revoluble shaft and a homogeneous arm or body carried thereby, and a triangular coil or solenoid, the homogeneous arm or body being arranged so that a portion thereof at least lies in the triangular opening in the coil or solenoid and having an index, all arranged so that when the index is at zero the arm or body rests at its greatest distance from the sides of the coil and as the indicator moves toward the higher readings the arm or body approaches nearer to said sides and arranged to operate in a plurality of positions substantially as described.

3. In an electrical measuring instrument a V-shaped open coil within the opening of which lies a homogeneous magnetizable arm or body, said arm or body being mounted on a shaft and having an indicator and scale for reading the movements of the arm and indicator and a resilient device for controlling the return of the indicator to zero and opposing the movements of the arm or body against the force generated in the coil substantially as described.

4. In a measuring instrument a pointer or index provided with separate sights arranged to eliminate the error due to parallax substantially as described.

5. In an electrical measuring instrument an angular-shaped open coil or solenoid within the opening of which is a homogeneous magnetizable movable arm or body, said arm or body being arranged to be moved by the resultant force of a current passing through the coil and to move the arm from zero to higher readings, and having a resilient device arranged to return the arm to zero when no current is in the coil, and having a scale and indicator arranged to indicate the movements of the arm and an air-brake arranged to steady the motion of the moving parts substantially as described.

6. In an electrical measuring instrument an angular coil or solenoid and an arm, a portion of which at least, rests in the opening in the coil, and arranged to be horizontally deflected, and having a pointer arranged to be moved or deflected in unison with said arm and a graduated scale to which the pointer points as it moves substantially as described.

In testimony whereof I affix my signature in presence of two witnesses.

JESSE HARRIS.

Witnesses:
W. M. BROWN,
JAMES M. BROWN.